US011743408B2

(12) United States Patent
Yamamoto

(10) Patent No.: US 11,743,408 B2
(45) Date of Patent: Aug. 29, 2023

(54) IMAGE READING DEVICE CONTROL METHOD, IMAGE READING DEVICE, AND NON-TRANSITORYCOMPUTER-READABLE MEDIUM WITH STORED PROGRAM

(71) Applicant: NEC Platforms, Ltd., Kawasaki (JP)

(72) Inventor: Tetsuichiro Yamamoto, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 17/798,115

(22) PCT Filed: Feb. 9, 2021

(86) PCT No.: PCT/JP2021/004809
§ 371 (c)(1),
(2) Date: Aug. 8, 2022

(87) PCT Pub. No.: WO2021/176971
PCT Pub. Date: Sep. 10, 2021

(65) Prior Publication Data
US 2023/0077148 A1   Mar. 9, 2023

(30) Foreign Application Priority Data

Mar. 3, 2020   (JP) .................................. 2020-035793

(51) Int. Cl.
*H04N 1/193*   (2006.01)
*H04N 23/70*   (2023.01)

(52) U.S. Cl.
CPC ............. *H04N 1/193* (2013.01); *H04N 23/70* (2023.01)

(58) Field of Classification Search
CPC ...... H04N 1/1911; H04N 1/0402; H04N 1/04; H04N 1/193; H04N 1/0414; H04N 1/0443;
(Continued)

(56) References Cited

U.S. PATENT DOCUMENTS 5,068,913 A * 11/1991 Sugiura ................ H04N 1/0473
382/175
5,365,605 A * 11/1994 Hosogoe ................ H04N 1/107
235/462.35
5,852,550 A * 12/1998 Majid ............... H02M 3/33523
363/19
(Continued)

FOREIGN PATENT DOCUMENTS

JP   2002-016762 A   1/2002
JP   2002-314759 A   10/2002
(Continued)

OTHER PUBLICATIONS

International Search Report for PCT Application No. PCT/JP2021/004809, dated Apr. 27, 2021.
(Continued)

*Primary Examiner* — Negussie Worku
(74) *Attorney, Agent, or Firm* — Sughrue Mion, PLLC

(57) ABSTRACT

The present invention provides a control method of an image reading device, an image reading device, and a non-transitory computer-readable medium having a program stored thereon, which avoid a reduction in reading resolution. The control method of the image reading device includes: a first step (ST101) of generating N line-shaped images indicating N line-shaped regions (W11) in an imaging target (T1) being conveyed in a conveying direction (X1) by imaging the N line-shaped regions (W11) extending in a direction perpendicular to the conveying direction (X1); a second step (ST102) of performing the same step as the first step (ST101) at a point in time when the imaging target (T1) is conveyed by an amount associated to a width (11a) of N−1 line-shaped regions; and a step (ST103) of generating a read image by arranging the N line-shaped images generated in each of the steps in ascending order.

9 Claims, 19 Drawing Sheets

(58) Field of Classification Search
CPC .. H04N 1/0458; H04N 1/1013; H04N 1/1912; H04N 23/00; H04N 23/60; H04N 1/0411; H04N 1/0449; H04N 23/70; H04N 1/484; H04N 1/486; G01T 1/00
USPC .......................................................... 358/474
See application file for complete search history.

(56) References Cited

U.S. PATENT DOCUMENTS

| | | | |
|---|---|---|---|
| 6,198,550 B1* | 3/2001 | Toyoda | H04N 1/486 358/506 |
| 2002/0063785 A1 | 5/2002 | Yamamoto et al. | |
| 2012/0133999 A1* | 5/2012 | Lin | H04N 1/484 358/509 |
| 2015/0381846 A1* | 12/2015 | Shimizu | H04N 1/02815 358/474 |

FOREIGN PATENT DOCUMENTS

| | | |
|---|---|---|
| JP | 2004-104483 A | 4/2004 |
| JP | 2005-322990 A | 11/2005 |
| JP | 2018-007095 A | 1/2018 |

OTHER PUBLICATIONS

JP Office Action for JP Application No. 2020-035793, dated May 18, 2021 with English Translation.
JP Office Action for JP Application No. 2020-035793, dated Nov. 2, 2021 with English Translation.

* cited by examiner

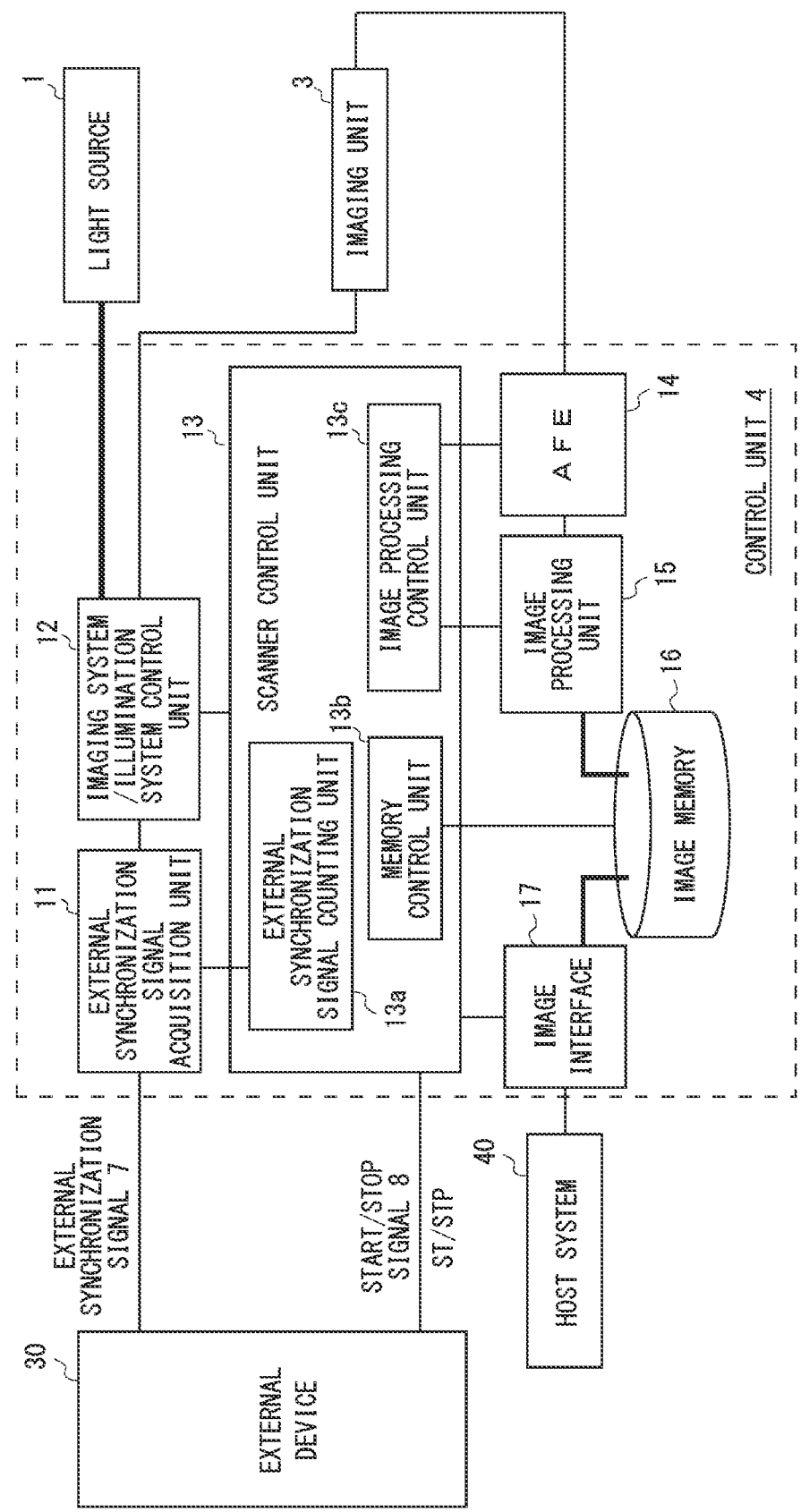

Fig. 13B

IMAGE READING DEVICE CONTROL METHOD, IMAGE READING DEVICE, AND NON-TRANSITORYCOMPUTER-READABLE MEDIUM WITH STORED PROGRAM

This application is a National Stage Entry of PCT/JP2021/004809 filed on Feb. 9, 2021, which claims priority from Japanese Patent Application 2020-035793 filed on Mar. 3, 2020, the contents of all of which are incorporated herein by reference, in their entirety.

TECHNICAL FIELD

The present invention relates to a control method of an image reading device, an image reading device, and a non-transitory computer-readable medium having a program stored thereon, and more particularly, relates to a control method of an image reading device, an image reading device, and a non-transitory computer-readable medium having a program stored thereon that read a captured image of an imaging target article.

BACKGROUND ART

Patent Literature 1 discloses an image reading device that reads a document image by using a three-line CCD image sensor. In the image reading device, a lamp for illuminating a document surface of a document to be inspected is driven to blink by a lamp driving circuit in synchronization with a line synchronization signal from a timing generator, and the lamp is intermittently turned on. As a result, a substantial exposure period is shortened, and a reduction in resolution is prevented.

CITATION LIST

Patent Literature

[Patent Literature 1] Japanese Unexamined Patent Application Publication No. 2002-314759

SUMMARY OF INVENTION

Technical Problem

However, even in such an image reading device, the reading resolution may be reduced.

In view of the problem described above, an object of the present disclosure is to provide a control method of an image reading device, an image reading device, and a program that avoid a reduction in reading resolution.

Solution to Problem

A control method of an image reading device according to one example embodiment of the present disclosure includes:

a first step of generating N (N is a natural number of 2 or more) line-shaped images indicating N line-shaped regions in an imaging target being conveyed in a conveying direction by imaging the N line-shaped regions extending in a direction perpendicular to the conveying direction, the N line-shaped regions being arranged in parallel, spaced apart by a width of the N line-shaped regions in the conveying direction;

a second step of performing, after the first step has been performed, the same step as the first step at a point in time when the imaging target is conveyed by an amount associated to a width of N−1 line-shaped regions; and a step of generating a read image by arranging N line-shaped images generated in each of the steps in ascending order.

An image reading device according to one example embodiment of the present disclosure includes:

an imaging unit configured to include N line-shaped imaging elements arranged in parallel at predetermined intervals;

an external synchronization signal acquisition unit configured to acquire an external synchronization signal indicating that an imaging target has been conveyed by an amount associated to a width of N−1 line-shaped regions in a conveying direction; and an image processing control unit, wherein each time the external synchronization signal acquisition unit acquires the external synchronization signal, the imaging unit uses the N line-shaped imaging elements and images N line-shaped regions in the imaging target, the N line-shaped regions being arranged in parallel, spaced apart by a width of N line-shaped regions in the conveying direction and extending in a direction perpendicular to the conveying direction, thereby generating a plurality of sets of N line-shaped images, and the image processing control unit generates a read image indicating the imaging target by arranging N sets of the generated N line-shaped images in ascending order.

A non-transitory computer-readable medium having a program stored thereon according to one example embodiment of the present disclosure stores a program causing a computer to execute:

a first step of generating N line-shaped images indicating N line-shaped regions in an imaging target being conveyed in a conveying direction by imaging the N line-shaped regions extending in a direction perpendicular to the conveying direction, the N line-shaped regions being arranged in parallel, spaced apart by a width of N line-shaped regions in the conveying direction;

a second step of performing, after the first step has been performed, the same step as the first step at a point in time when the imaging target is conveyed by an amount associated to a width of N−1 line-shaped regions; and a step of generating a read image by arranging N line-shaped images generated in each of the steps in ascending order.

Advantageous Effects of Invention

According to the present disclosure, it is possible to provide a control method of an image reading device, an image reading device, and a non-transitory computer-readable medium having a program stored thereon that avoid a reduction in reading resolution.

BRIEF DESCRIPTION OF DRAWINGS

FIG. 4 is a block diagram illustrating a control system of the image reading device according to the first example embodiment;

FIG. 13B is a schematic diagram illustrating a relationship among a portion of an imaging target article, an imaging timing, an illumination timing, and an output image;

EXAMPLE EMBODIMENT

Figure 1:
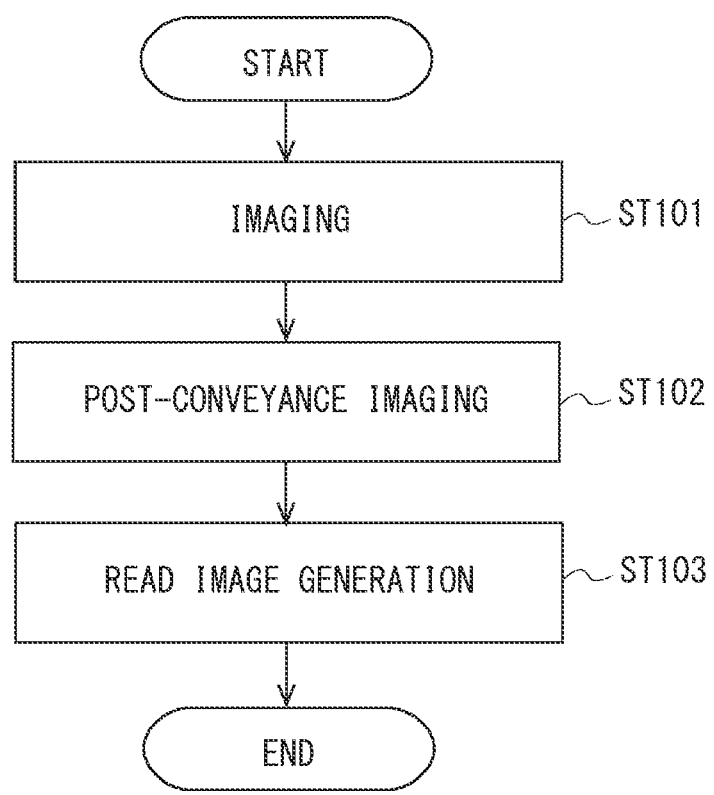
FIG. 1 is a flowchart illustrating a control method of an image reading device according to an example embodiment.

An example embodiment of the present invention will be described with reference to FIG. 1. FIG. 1 is a flowchart illustrating a control method of an image reading device according to the example embodiment.

N line-shaped regions in an imaging target conveyed in a predetermined conveying direction is imaged (imaging step ST101). N may be any natural number of 2 or more. As a result, N line-shaped images illustrating N line-shaped regions are generated. The N line-shaped regions are arranged in parallel, spaced apart by a width of the N line-shaped regions in the conveying direction on the surface of the imaging target. The N line-shaped regions extend in a direction perpendicular to the conveying direction.

Subsequently, the same step as the imaging step ST101 is performed at a time point when the imaging target is conveyed by an amount associated to a width of N−1 line-shaped regions (post-conveyance imaging step ST102). The post-conveyance imaging step ST102 may be repeated a plurality of times in succession.

The N line-shaped images generated in the steps described above are arranged in ascending order to generate a read image (read image generation step ST103). The read image may be generated by outputting only a plurality of line-shaped images arranged in succession among the line-shaped images arranged in ascending order.

As described above, in the read image, since the N line-shaped images generated in each step are arranged in ascending order, consecutive line-shaped images are adjacent to each other. Therefore, while the read image indicates a main portion of the imaging target, the line-shaped images do not overlap with each other. Therefore, there is no reduction in reading resolution due to overlapping of successive line-shaped images. As a result, it is possible to avoid a reduction in the reading resolution.

Further, the post-conveyance imaging step ST102 may be repeated a plurality of times in succession. In some cases, a read image is generated by outputting only a plurality of line-shaped images arranged in succession among the line-shaped images arranged in ascending order. According to these methods, since the read image includes a plurality of successive line-shaped images, there is no fear that the high reading resolution is reduced, and the main portion of the imaging target can be presented.

First Example Embodiment

Figure 2:
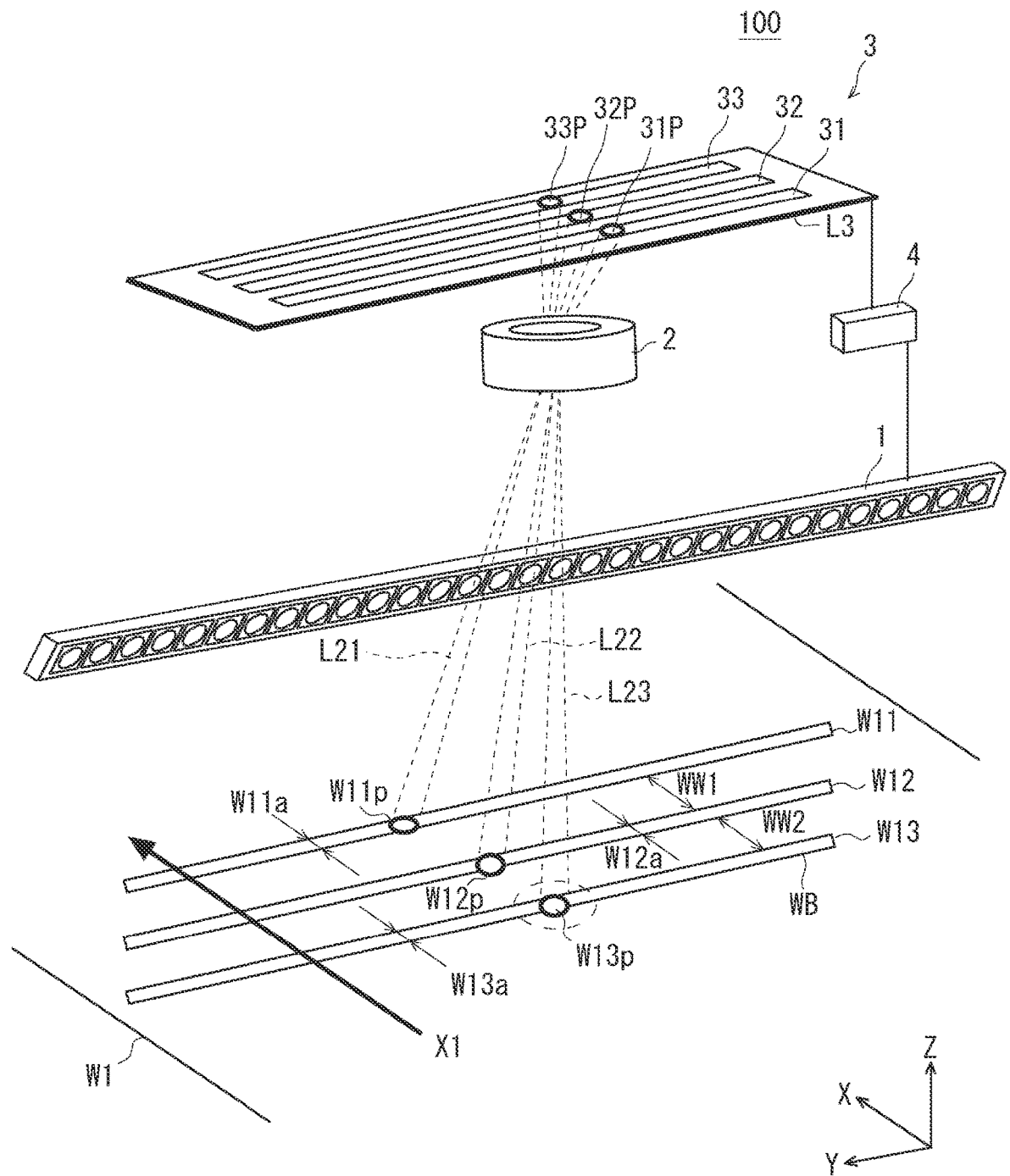
FIG. 2 is a perspective view illustrating one configuration example of an image reading device according to a first example embodiment.
Figure 3A:
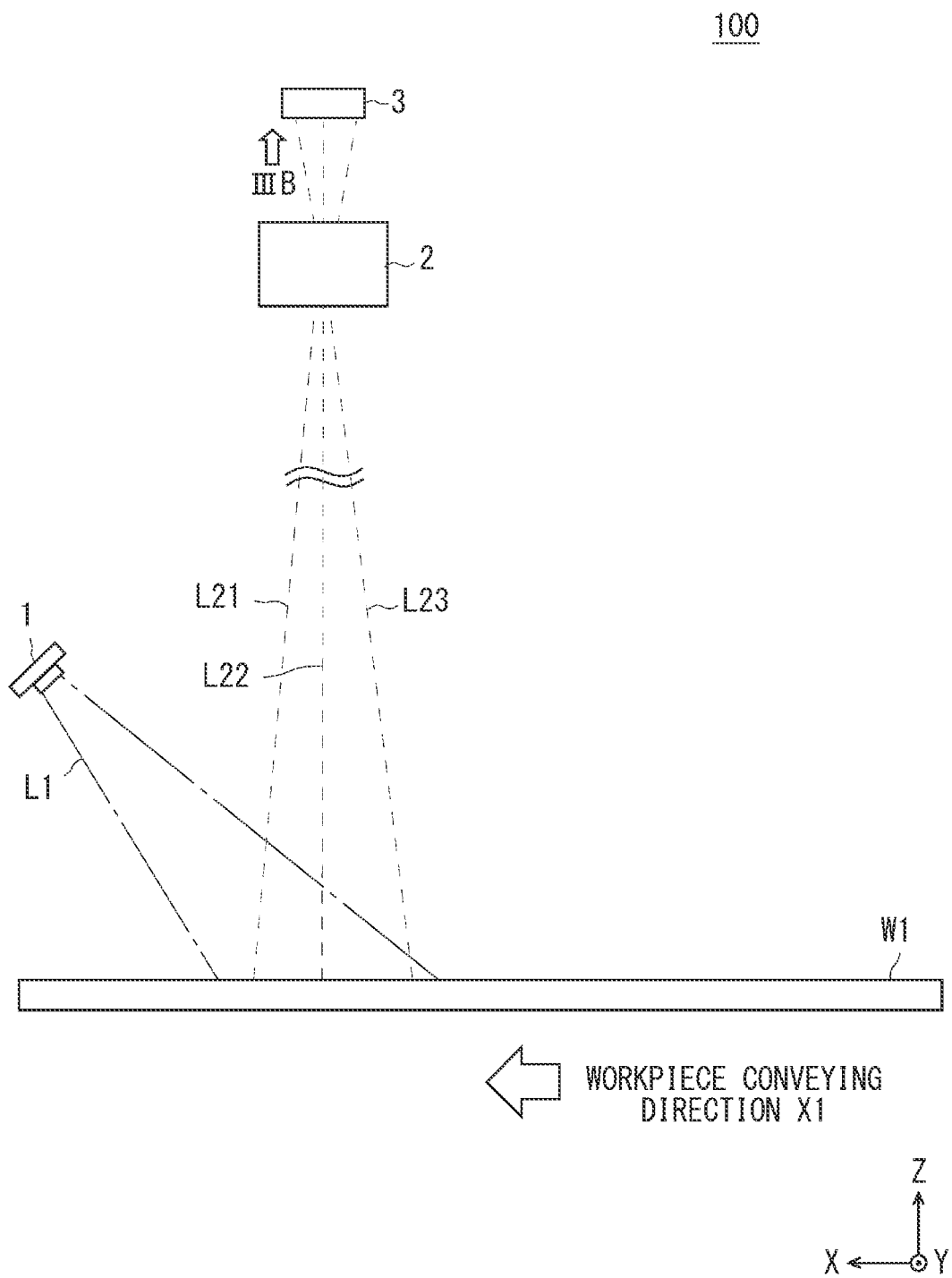
FIG. 3A is a side view illustrating one configuration example of the image reading device according to the first example embodiment.
Figure 3B:
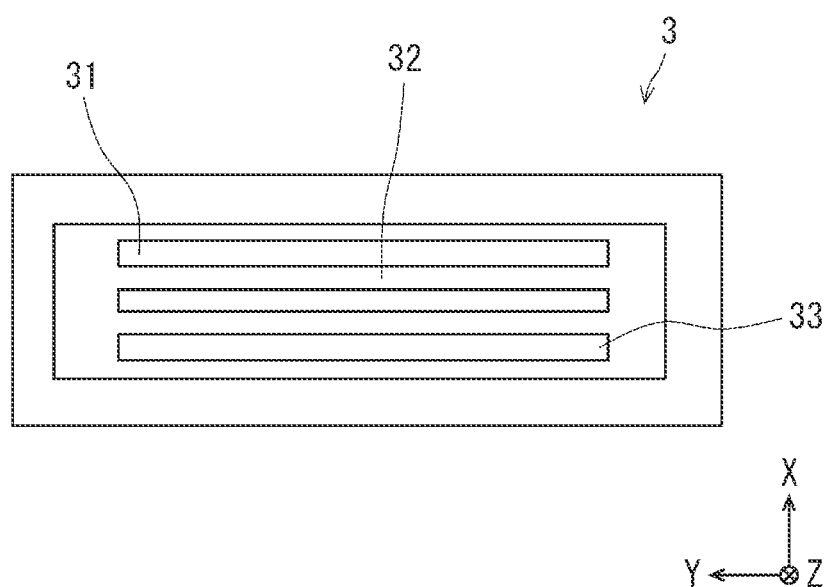
FIG. 3B is a bottom view illustrating a main portion of one configuration example of the image reading device according to the first example embodiment.

A first example embodiment will be described with reference to the drawings. FIG. 2 is a perspective view illustrating one configuration example of an image reading device according to the first example embodiment. FIG. 3A is a side view of the configuration example of the image reading device illustrated in FIG. 2. FIG. 3B is a bottom view illustrating a main portion of the configuration example illustrated in FIG. 3A.

As illustrated in FIGS. 2 and 3A, an image reading device 100 includes a light source 1, a lens 2, an imaging unit 3, and a control unit 4. The image reading device 100 uses a workpiece W1 as an imaging target.

The workpiece W1 is conveyed in a workpiece conveying direction X1 by a conveying device or the like. On the surface of the workpiece W1, lines W11, W12, and W13 are present. The lines W11, W12, and W13 are line-shaped regions extending in a direction substantially perpendicular to the workpiece conveying direction X1. The lines W11, W12, and W13 are arranged in parallel. The lines W11, W12, and W13 are read by the image reading device 100. The widths W11a, W12a, and W13a of the lines W11, W12, and W13 have the same size. The distance WW1 between the line W11 and the line W12 and the distance WW2 between the line W12 and the line W13 are the same. The distances WW1 and WW2 are twice the width W11a. Note that, N lines similar to the lines W11 to W13 may be provided on the surface of the workpiece W1, and the distance between the lines may be N−1 times the width of the lines.

The light source 1 irradiates illumination light to a region including at least the lines W11, W12, and W13 on the surface of the workpiece W1. The light source 1 may irradiate illumination light extending in a direction substantially perpendicular to the workpiece conveying direction X1 on the surface of the workpiece W1, and may sufficiently illuminate the lines W11, W12, and W13. The light source 1 is, for example, a light-emitting diode (LED) array. An LED array is a plurality of LEDs linearly aligned.

The lens 2 is provided between the workpiece W1 and the imaging unit 3. The lens 2 transmits light from the workpiece W1. The transmitted light is directed toward the imaging unit 3.

The imaging unit 3 may be any unit as long as it generates a monochrome image, and is, for example, a monochrome charge coupled device (CCD) sensor or a monochrome complementary metal oxide semiconductor (CMOS) sensor. As illustrated in FIG. 3B, the imaging unit 3 includes light-receiving element rows 31, 32, and 33. The light-receiving element rows 31, 32, and 33 include a plurality of light-receiving elements arranged in one direction.

As illustrated in FIGS. 2 and 3A, the light source 1 irradiates the lines W11, W12, and W13 with illumination light L1, and the light from the lines W11, W12, and W13 passes through the lens 2 to form images in the light-receiving element rows 31, 32, and 33, respectively. Specifically, light L21 from a point W11$p$ of the line W11 forms an image on a light-receiving element 31$p$ of the light-receiving element row 31. Similarly, light L22 from a point W12$p$ of the line W12 forms an image on a light-receiving element 32$p$ of the light-receiving element row 32. Light L23 from a point W13$p$ of the line W13 forms an image on a light-receiving element 33$p$ of the light-receiving element row 33. The light-receiving element rows 31, 32, and 33 photoelectrically convert the imaging light to generate an analog image signal.

As illustrated in FIG. 4, the control unit 4 includes an external synchronization signal acquisition unit 11, an imaging system/illumination system control unit 12, a scanner control unit 13, an analog front end (AFE) 14, an image processing unit 15, an image memory 16, and an image interface 17.

The external synchronization signal acquisition unit 11 acquires an external synchronization signal 7 (Sync 0) from an external device 30. The external device 30 is, for example, a conveying device that conveys the workpiece W1. The external synchronization signal 7 is, for example, an encoder signal output from a conveyance device that conveys the workpiece W1. For example, when the conveying device conveys the workpiece W1 using a motor, the external synchronization signal 7 corresponds to the rotational displacement of the rotor of the motor.

The imaging system/illumination system control unit 12 acquires a control signal from the external synchronization signal 7 or the scanner control unit 13. The imaging system/illumination system control unit 12 controls the operations of the light source 1 and the imaging unit 3, based on the acquired external synchronization signal 7 and the control signal.

The scanner control unit 13 includes an external synchronization signal counting unit 13$a$, a memory control unit 13$b$, and an image processing control unit 13$c$. The external synchronization signal counting unit 13$a$ counts the external synchronization signal 7 and calculates the amount by which the workpiece W1 is conveyed. The memory control unit 13$b$ controls the operation of the image memory 16. The image processing control unit 13$c$ controls the operation of the image processing unit 15.

The analog front end (AFE) 14 converts, for example, an analog image signal generated by the imaging unit 3 into a digital image signal. The image processing unit 15 performs image processing on the image signal from the AFE 14 as appropriate to generate image information. The image memory 16 records the image information generated by the image processing unit 15. The image interface 17 outputs the image information recorded in the image memory 16 to a host system 40 as appropriate.

The control unit 4 is able to use a computer as a hardware configuration. Specifically, the control unit 4 may include a control device, a central processing unit, a storage medium storing various programs, an interface to which a user can perform input and output, and the like. When the control device reads various programs stored on the storage medium and the central processing unit executes the programs, the computer of the control unit 4 is able to function as the external synchronization signal acquisition unit 11 or the like.

(Control Method)

Figure 5A:
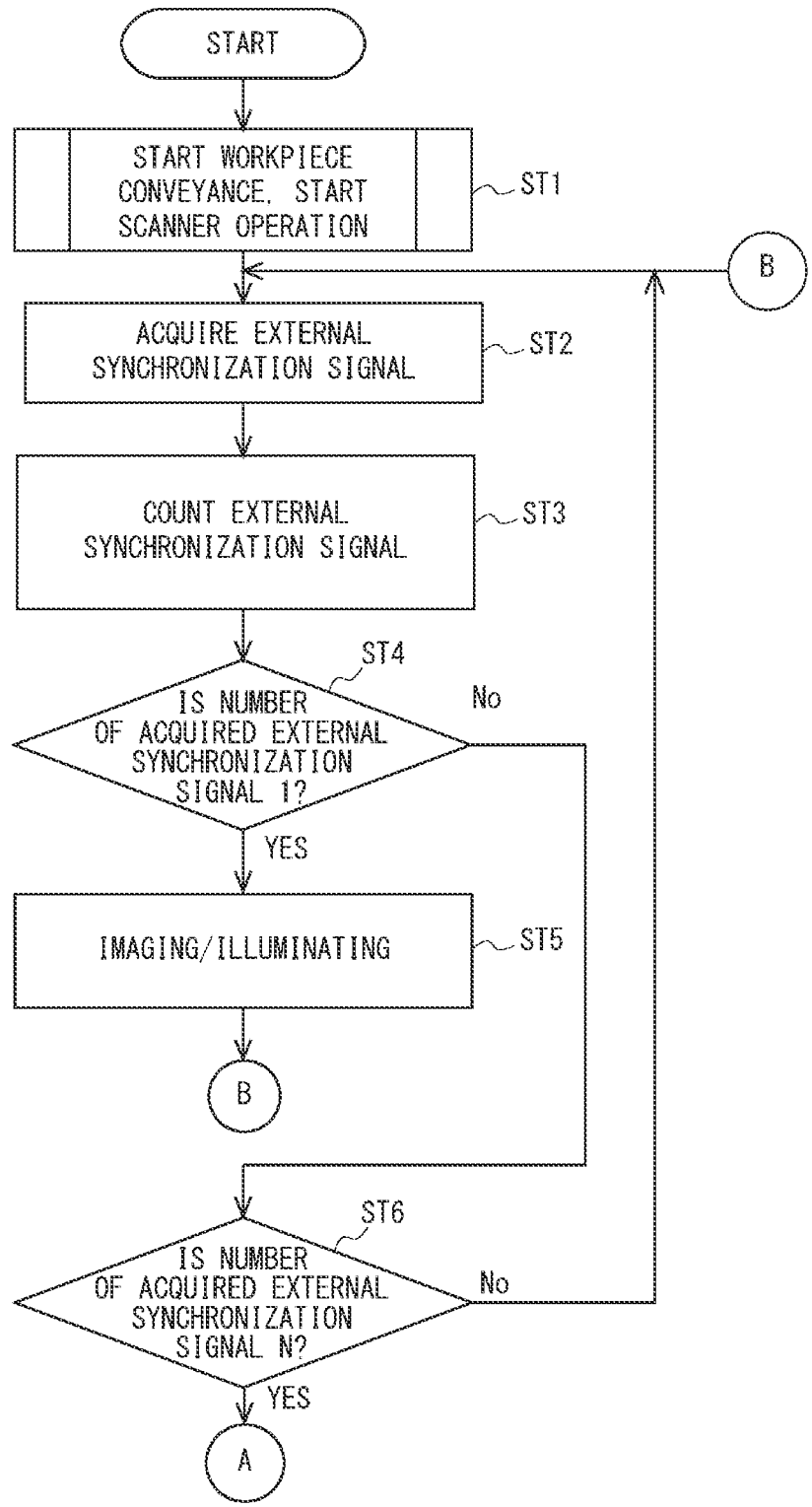
FIG. 5A is a flowchart illustrating a control method of the image reading device according to the first example embodiment.
Figure 5B:
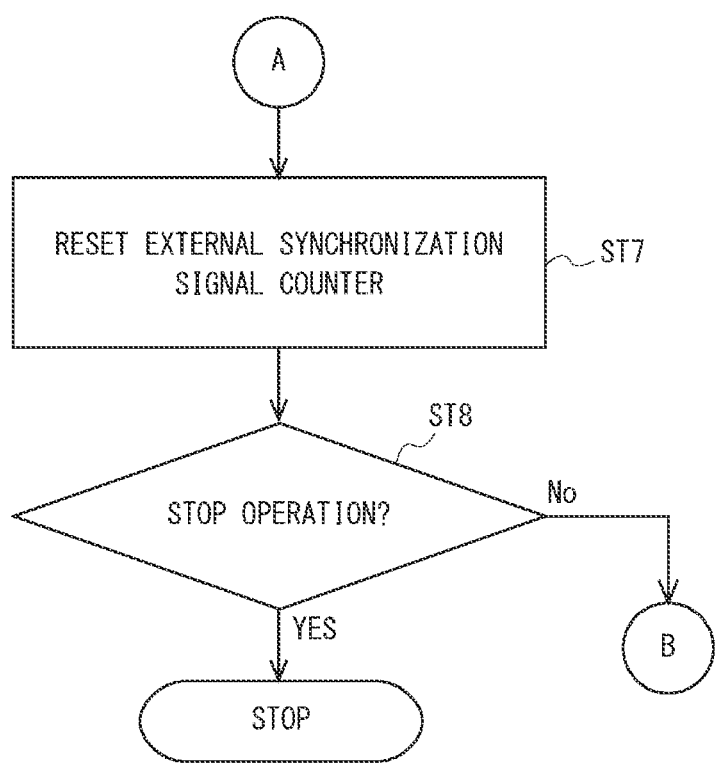
FIG. 5B is a flowchart illustrating a control method of the image reading device according to the first example embodiment.

Next, with reference to FIGS. 5A and 5B, a control method of the image reading device 100 will be described. FIGS. 5A and 5B are flowcharts illustrating a control method of the image reading device according to the first example embodiment. The control method of the image reading device 100 performs steps associated to the imaging step ST101 and the post-conveyance imaging step ST102 illustrated in FIG. 1. In the control method of the image reading device 100, a CCD sensor is used as the imaging unit 3 illustrated in FIG. 2.

Conveyance of the workpiece W1 is started, and a scanner operation is started simultaneously (step ST1).

Then, the external synchronization signal 7 is acquired from the external device 30 (step ST2). The initial value of the external synchronization signal 7 is 1. The external synchronization signal 7 is generated according to an amount by which the external device 30 conveys the workpiece W1. The external synchronization signal 7 is output at the time point when the conveyance of the workpiece W1 is started, and thereafter, is output every time the conveyance amount of the workpiece W1 exceeds the width of one line. The external synchronization signal 7 is counted (step ST3).

Then, the number of times (Sync. 0) of acquiring the external synchronization signal 7 is determined (steps ST4 and ST6).

When the number of times of acquiring the external synchronization signal 7 is 1 (step ST4: YES), the light source 1 is turned on and illuminating light is irradiated while imaging is performed using the imaging unit 3 (step ST5). Specifically, N line-shaped regions are imaged using the CCD sensor used as the imaging unit 3, and a line-shaped image is generated. In addition, the light source 1 is turned on for the time taken to convey the width of one line. Thereafter, the process returns to step ST2.

When the number of times of acquiring the external synchronization signal 7 exceeds 1 (step ST4: NO) and is less than N (step ST6: NO), the process returns to step ST2. In other words, after the number of times of acquiring the external synchronization signal 7 exceeds 1, the external synchronization signal 7 is acquired until the number of times reaches N, and the number of times of acquisition is counted repeatedly (steps ST2 and ST3).

When the number of times of acquiring the external synchronization signal 7 reaches N (step ST4: NO, step ST6: YES), the number of times of acquiring the external synchronization signal 7 is reset (step ST7). In other words, the number of times the external synchronization signal 7 is acquired is returned to the initial value, that is, 0 (zero).

Then, determination is made whether or not to stop the operation of the image reading device 100 (step ST8). Specifically, when the number of images captured in step ST5 reaches a number necessary to form a read image, the operation of the image reading device 100 is stopped. Otherwise, the operation of the image reading device 100 is continued. When the operation of the image reading device 100 is to be continued (step ST8: NO), the process returns to step ST2. Otherwise (step ST8: YES), the operation of the image reading device 100 is stopped.

As described above, it is possible to obtain a necessary number of line-shaped images for forming a read image. A read image can be formed by use of the obtained line-shaped images.

(Timing Chart for Each Configuration)

Figure 6:
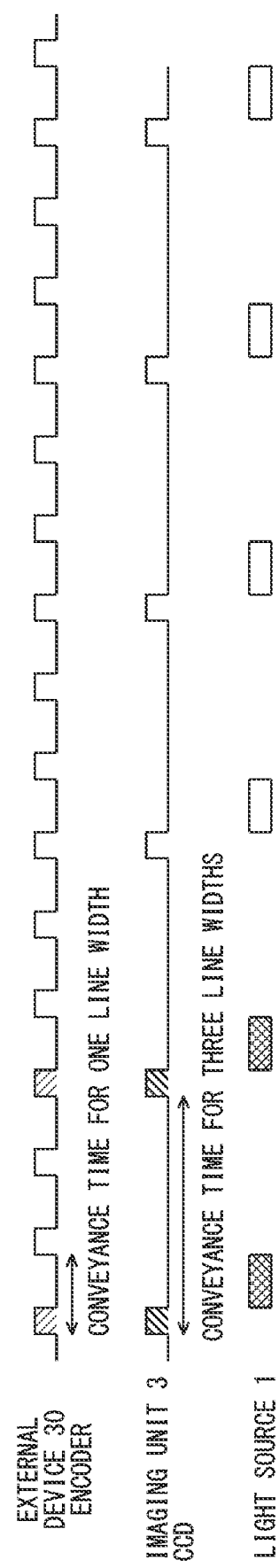
FIG. 6 is one example of a timing chart illustrating an external synchronization signal, imaging, and an operation of a light source in the control method of the image reading device according to the first example embodiment.

Next, with reference to FIG. 6, the external synchronization signal and the operations of the imaging unit and the light source in the control method of the image reading device according to the first example embodiment will be described. FIG. 6 is one example of a timing chart illustrating the external synchronization signal and operations of the imaging unit and the light source in the control method of the image reading device according to the first example embodiment. Herein, an encoder of the external device 30 generates the external synchronization signal 7. A CCD is used as the imaging unit 3.

As illustrated in FIG. 6, the encoder of the external device 30 is turned on for a predetermined time. The external synchronization signal 7 is output to the external synchronization signal acquisition unit 11 of the control unit 4 illustrated in FIG. 4.

Then, the encoder of the external device 30 is turned off for a predetermined time. The output of the external synchronization signal 7 is stopped. The period in which the encoder of the external device 30 is in the on/off state is the same as the conveyance time in which the imaging target is conveyed by an amount associated to a width of one line-shaped region.

Every time the encoder of the external device 30 repeats the on/off state N times, the imaging unit 3 repeats the on/off state once. In the example illustrated in FIG. 6, each time the encoder of the external device 30 repeats the on/off state three times, the imaging unit 3 repeats the on/off state once. The period during which the imaging unit is in the on/off state may be the same as the conveyance time for conveying the imaging target by an amount associated to a width of N line-shaped regions.

Every time the imaging unit 3 repeats the on/off state once, the light source 1 repeats the on/off state once. The light source 1 is turned on when the imaging unit 3 is turned off from the on state. Thereby, the irradiation of the illumination light to the imaging target T1 is started in synchronization with the imaging timing at which the imaging target T1 being conveyed is imaged. After the irradiation is started, the irradiation of the illumination light is stopped at a point in time when the imaging target T1 is conveyed by an amount associated to a distance in the conveying direction of one line-shaped region.

Figure 15:
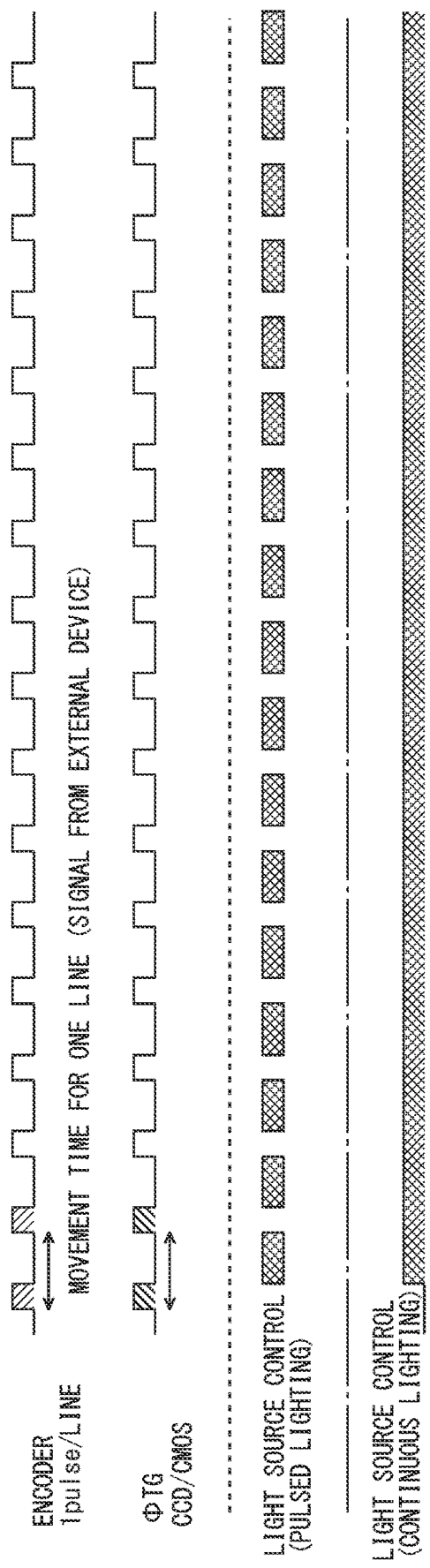
FIG. 15 is one example of a timing chart illustrating an external synchronization signal, imaging, and an operation of a light source in a control method of an image reading device of a related art.

Incidentally, FIG. 15 illustrates one example of a timing chart. FIG. 15 is one example of a timing chart illustrating an external synchronization signal, imaging, and an operation of a light source in the control method of the image reading device of a related art. An image reading device of this related art images and illuminates one line at a time. The light source may be pulsed or continuously lit.

The lighting time of the light source 1 illustrated in FIG. 6 is short compared to the lighting time of the light source in the case of pulsed lighting and continuous lighting illustrated in FIG. 15. Therefore, the control method of the image reading device according to the first example embodiment is superior in energy saving and low in the amount of heat generated by the light source as compared with the control method of the image reading device of the related art (see FIG. 15). Therefore, the heat dissipation structure of the image reading device may be simplified, and miniaturization and weight reduction may be achieved.

(One Example of Imaging Targets and Read Images)

Figure 7:
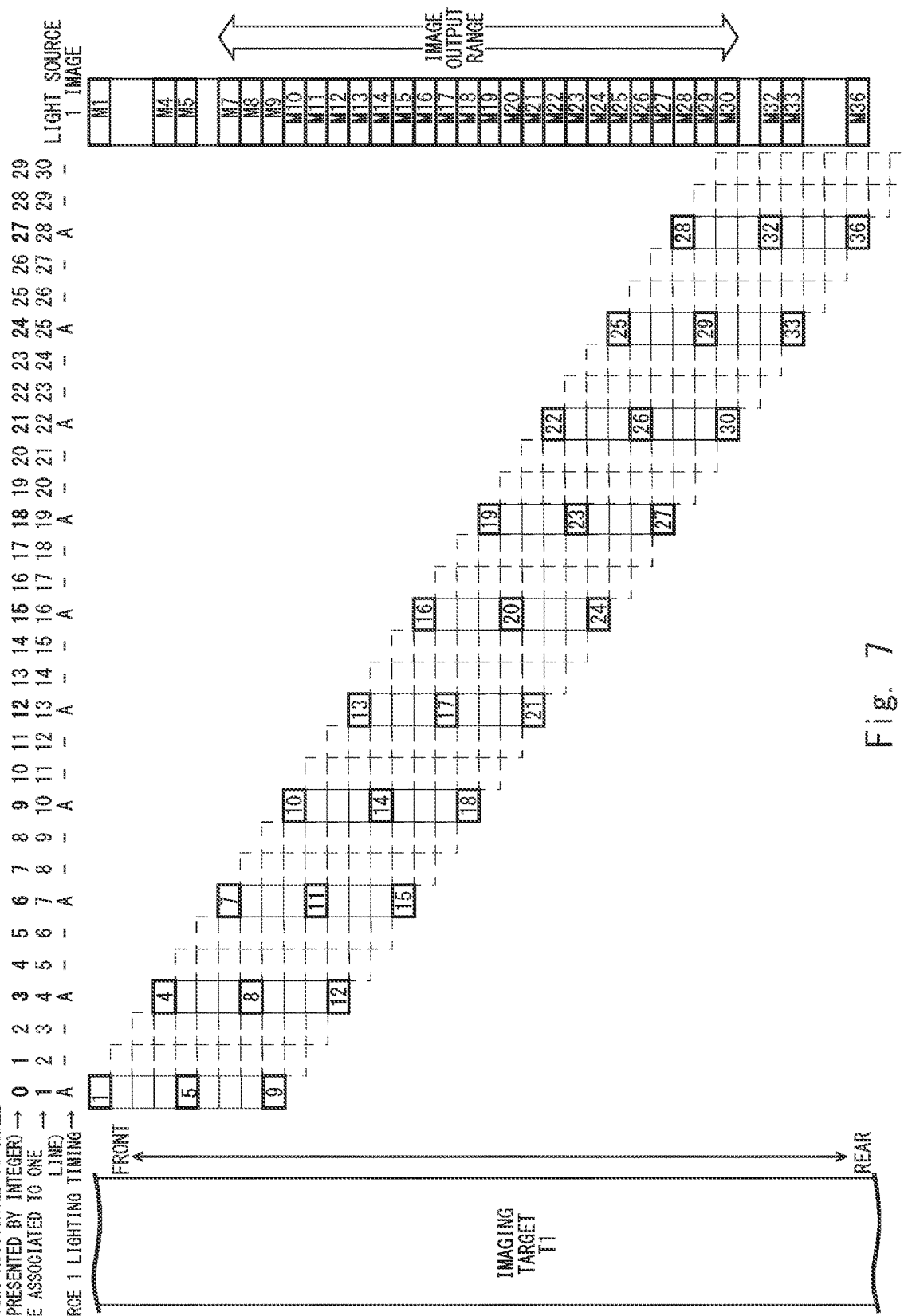
FIG. 7 is a schematic diagram illustrating a relationship among a portion of an imaging target, an imaging timing, an illumination timing, and a read image.

Next, with reference to FIG. 7, one example in which a read image indicating the imaging target T1 is generated using the image reading device 100 described above will be described. FIG. 7 is a schematic diagram illustrating a relationship among a portion to be imaged, an imaging timing, an illumination timing, and a read image.

As illustrated in FIG. 7, the imaging target T1 has a shape extending from the front side toward the rear side in the conveying direction. The imaging target T1 has a line-shaped region to be imaged. For the sake of clarity, FIG. 7 illustrates the line-shaped regions 1 to 36 as symbols surrounded by a square frame. FIG. 7 illustrates a timing at which the light source 1 is turned on and the line-shaped regions 1 to 36 at which each of the imaging targets T1 are imaged at each of conveyance times 0 to 29. The conveyance times 0 to 29 are associated with the conveyance amounts 1 to 30. The conveyance amount 1 is a width of three lines. The imaging target T1 is conveyed at a constant speed. The constant speed is the conveyance amount 1 per unit conveyance time 1. The conveyance amount 1 is equal to three line widths.

Each time the conveyance amount of the imaging target T1 increases by three, illumination light is irradiated from the light source 1 while imaging three line-shaped regions of the imaging target T1. For example, when the conveyance amount is 0, line-shaped regions 1, 5, and 9 of the imaging target T1 are imaged, and line-shaped images M1, M5, and M9 are generated. When the conveyance amount is 1, line-shaped regions 4, 8, and 12 of the imaging target T1 are imaged, and line-shaped images M4, M8, and M12 are generated. When the conveyance amount is 27, line-shaped regions 28, 35, and 32 of the imaging target T1 are imaged, and line-shaped images M28, M32, and M36 are generated. In addition, illumination light is irradiated from the light source 1 from when the conveyance amount of the imaging target T1 reaches 3 or more until the conveyance time reaches 4. When the conveyance amount is 0 to 1, 3 to 4, . . . , 27 to 28, illumination light is irradiated from the light source 1. Until the conveyance amount reaches 29, the line-shaped regions are imaged, and line-shaped images M1, M4, M5, M7 to M30, M32, M33, and M36 are generated. The line-shaped images M1, M4, M5, M7 to M30, M32, M33, and M36 each indicate line-shaped regions in the imaging target T1.

Then, the line-shaped images M1, M4, M5, M7 to M30, M32, M33, and M36 are arranged in ascending order. Specifically, the line-shaped images M1, M4, M5, M7 to M30, M32, M33, and M36 are arranged in the order from the front to the rear in the conveying direction of the imaging target T1. At least a part of the arranged line-shaped images M1, M4, M5, M7 to M30, M32, M33, and M36 may be used as a read image. For example, the line-shaped images M7 to M30 are used as read images. When the read image is composed of the line-shaped images M7 to M30, the line-shaped images M7 to M30 are successive without missing. Therefore, the read image indicates a main portion of the imaging target T1. Further, the line-shaped images M7 to M30 are arranged in ascending order and do not overlap. The end portions of adjacent line-shaped images M7 to M30 in the conveying direction are abutted against each other.

Therefore, the adjacent line-shaped images M7 to M30 have no gap therebetween and do not overlap. As a result, a reduction in the reading resolution of the read image can be avoided.

(One Specific Example of Read Image)

Next, as one example of an imaging target illustrated in FIG. 8, an example in which a read image is generated using the image reading device 100 according to the first example embodiment described above will be described.

Figure 8:
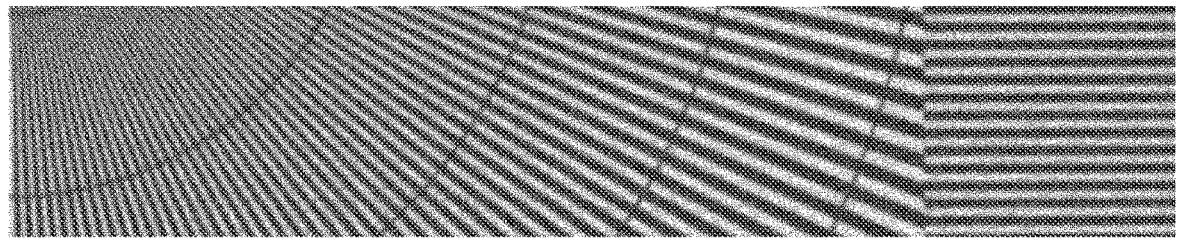
FIG. 8 is a photograph of one example of a still imaging target.
Figure 9:
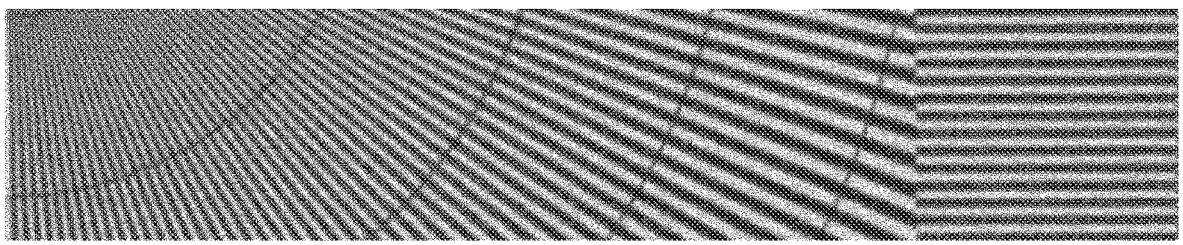
FIG. 9 is a read image illustrating one example of an imaging target article read using the image reading device according to the first example embodiment.
Figure 16:
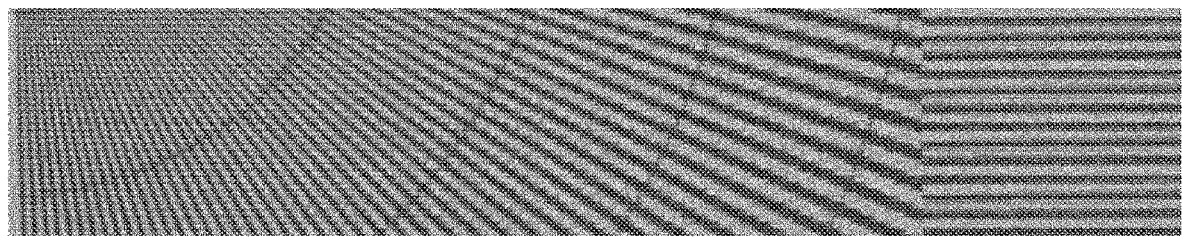
FIG. 16 is a read image illustrating one example of an imaging target article read using an image reading device according to a related art.

FIG. 8 is a photograph of one example of a still imaging target. FIG. 9 is a read image read by using the image reading device according to the first example embodiment in a state in which the example illustrated in FIG. 8 is being conveyed. FIG. 16 is a read image illustrating one example of an imaging target article read by using an image reading device of a related art.

The photograph of FIG. 8 is obtained by imaging one example of an imaging target which remains still without being conveyed. That is, in the photograph of FIG. 8, the example of an imaging target is photographed with almost no reduction in resolution. The example of an imaging target illustrated in FIG. 8 illustrates a clear line.

On the other hand, each line of the imaging target illustrated in FIG. 16 is blurred or unclear as a whole. Each line of the imaging target illustrated in FIG. 9 is blurred or unclear compared to each line of the imaging target illustrated in FIG. 8, but is clear compared to each line of the imaging target illustrated in FIG. 16. The read image illustrated in FIG. 9 has a higher resolution compared to the read image illustrated in FIG. 16. Therefore, the image reading device according to the first example embodiment is able to generate a read image having a higher resolution compared to the read image by the image reading device of the related art.

(Another Configuration Example of First Example Embodiment)

Figure 10:
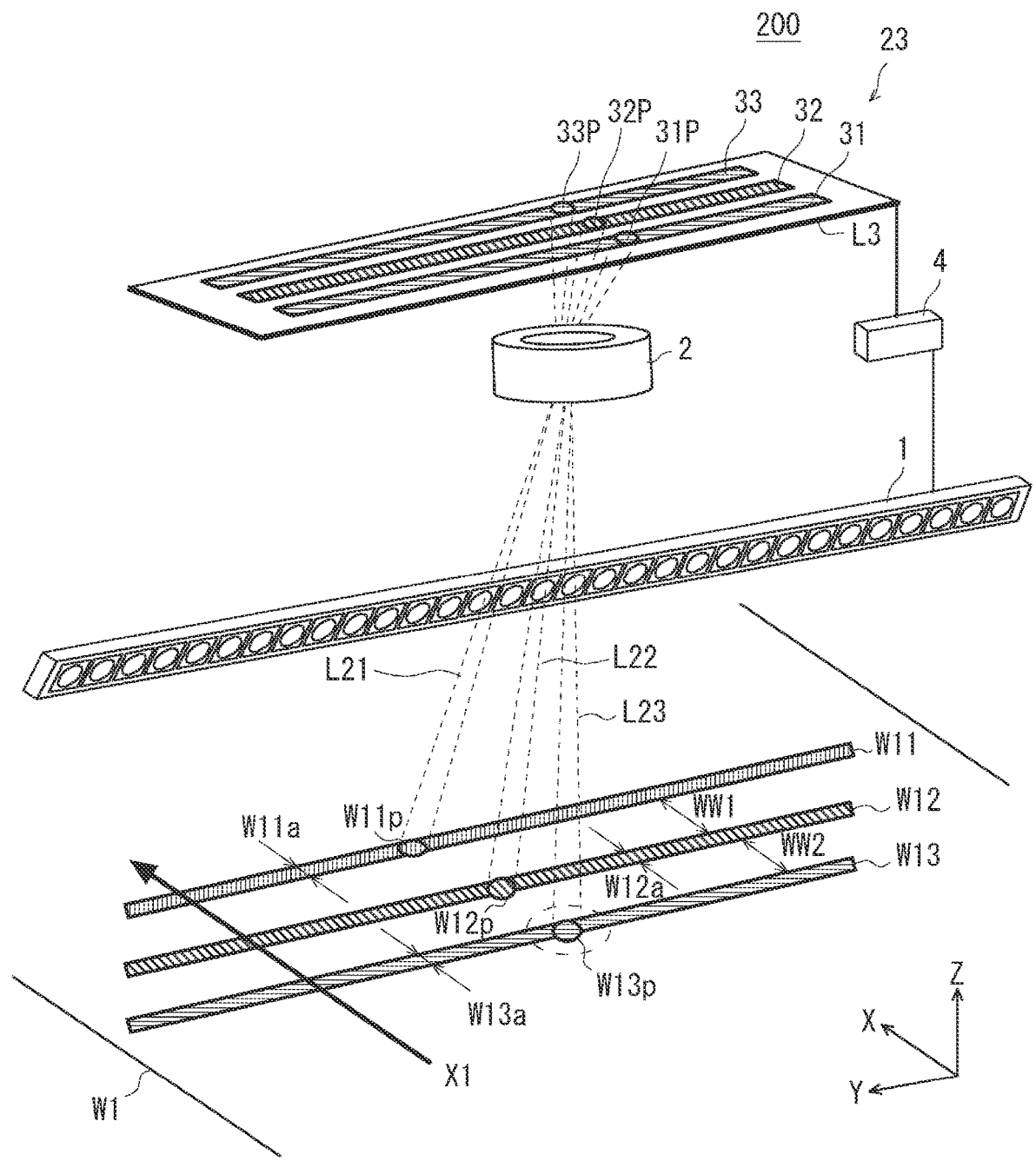
FIG. 10 is a perspective view illustrating one configuration example of an image reading device according to a second example embodiment.
Figure 11:
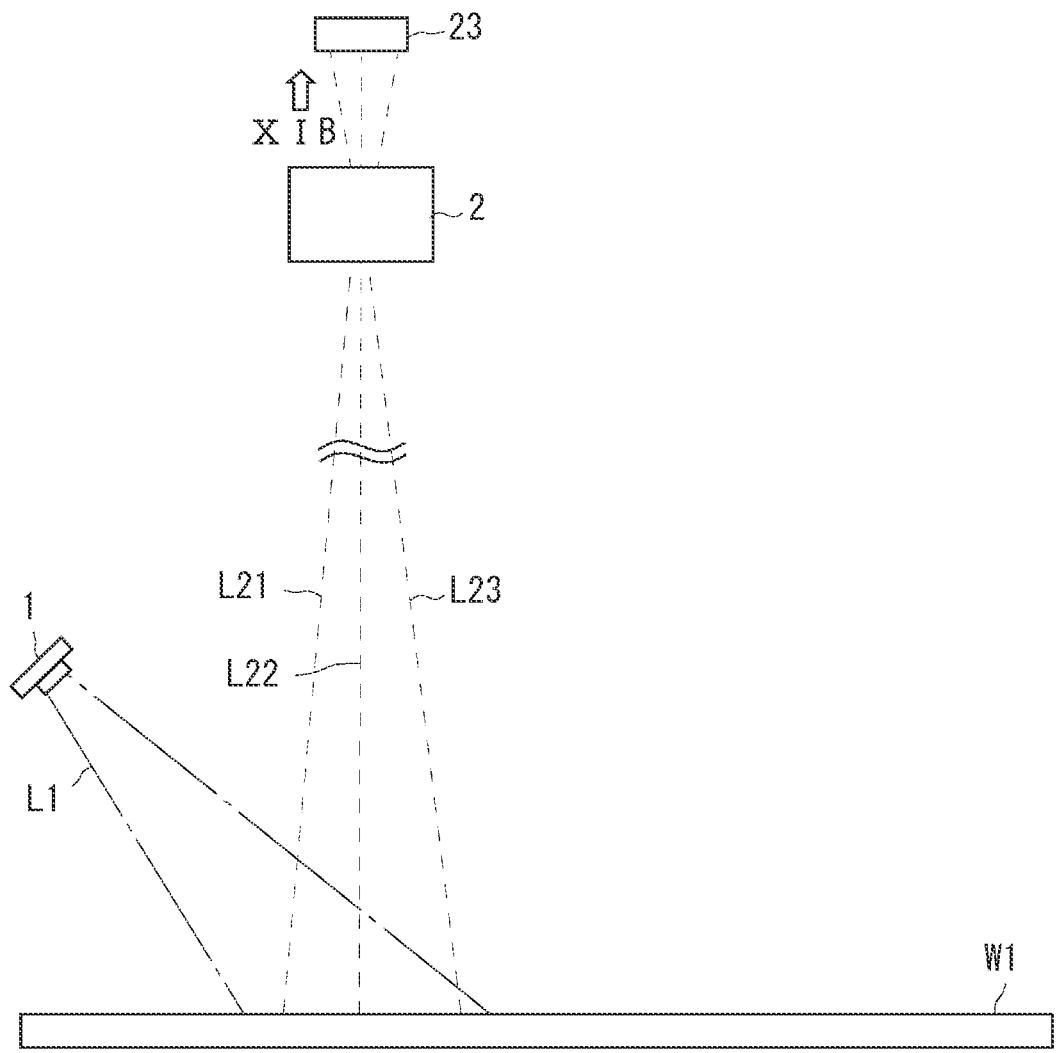
FIG. 11 is a side view illustrating one configuration example of the image reading device according to the second example embodiment.

An image reading device 200 is illustrated in FIGS. 10 and 11. The image reading device 200 has the same configuration as the image reading device 100 except for the imaging unit. FIG. 10 is a perspective view illustrating another configuration example of the image reading device according to the first example embodiment. FIG. 11 is a side view illustrating the configuration example of the image reading device illustrated in FIG. 10.

As illustrated in FIGS. 10 and 11, the image reading device 200 includes an imaging unit 23. The imaging unit 23 may be any unit as long as it generates a color image, and may be, for example, a color CCD sensor or a color CMOS sensor. The imaging unit 23 has the same configuration as the imaging unit 3 illustrated in FIG. 2 except that the imaging unit 23 includes a color filter (not illustrated). The color filters are mounted on, for example, light-receiving element rows 31, 32, and 33. The imaging unit 23 generates a color image indicating a line-shaped region in the imaging target.

As described above, since the imaging unit 23 generates a color image, the image reading device 200 is able to generate a read image using the color image. The image reading device 200 has the same configuration as the image reading device 100 except that the image reading device 200 includes the imaging unit 23. Therefore, similarly to the image reading device 100, the image reading device 200 is able to avoid a reduction in the resolution of the read image.

(Modification Example of First Example Embodiment)

Next, an image reading device 100a (not illustrated) as one modification example of the image reading device 100 will be described. The image reading device 100a has the same configuration as the image reading device 100 except that the image reading device 100a includes light sources 1A, 1B, and 1C.

The image reading device 100a includes the light sources 1A, 1B, and 1C. Similarly to the light source 1, the light sources 1A, 1B, and 1C irradiate illumination light to a region including at least a plurality of lines on the surface of the workpiece W1. The light sources 1A, 1B, and 1C are switched at predetermined timings to respectively irradiate illumination light. The illumination light irradiated by the light sources 1A, 1B, and 1C may be of different types, for example, red light, green light, and blue light.

Figure 12:
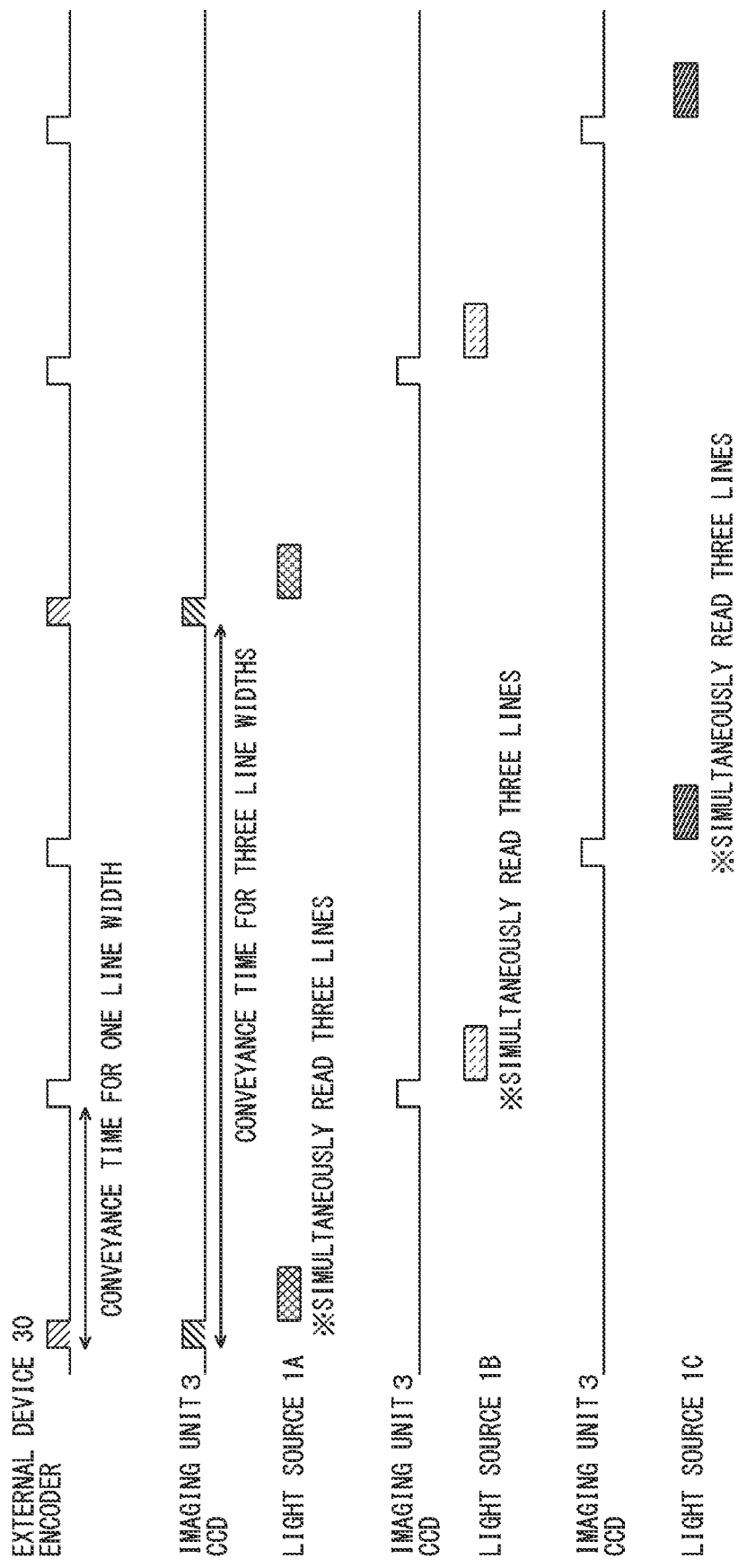
FIG. 12 is one example of a timing chart illustrating an external synchronization signal, imaging, and an operation of a light source.

Next, with reference to FIG. 12, an external synchronization signal and operations of the imaging unit and the light source in a control method of the image reading device 100a will be described. FIG. 12 is another example of a timing chart illustrating an external synchronization signal, imaging, and an operation of a light source. Herein, an encoder of an external device 30 generates an external synchronization signal 7. A CCD is used as an imaging unit 3.

As illustrated in FIG. 12, the encoder of the external device 30 is turned on for a predetermined time. The external synchronization signal 7 is output to the external synchronization signal acquisition unit 11 of the control unit 4 illustrated in FIG. 4. Subsequently, the encoder of the external device 30 is turned off for a predetermined time. The output of the external synchronization signal 7 is stopped. The period in which the encoder of the external device 30 is in an on/off state is the same as the conveyance time in which the imaging target is conveyed by an amount associated to the width of one line-shaped region. Note that the conveyance speed of the imaging target T1 is ⅓ of the conveyance speed of the imaging target T1 in the timing chart illustrated in FIG. 6. Therefore, the period in which the encoder of the external device 30 is in the on/off state is three times the predetermined time in the timing chart illustrated in FIG. 6.

Every time the encoder of the external device 30 repeats the on/off state once, the imaging unit 3 repeats the on/off state once, and further repeats lighting of the light sources 1A, 1B, and 1C in this order. The period in which the imaging unit 3 is in the on/off state is the same as the conveyance time in which the imaging target T1 is conveyed by an amount associated to a width of three line-shaped regions. The on/off state of the imaging unit 3 is controlled by using a transfer gate (TG), according to switching of the light sources 1A, 1B, and 1C. When being turned on, the imaging unit 3 reads three lines simultaneously.

The amount of heat generated by the lighting of the light sources 1A, 1B, and 1C illustrated in FIG. 12 is small compared to the amount of heat generated by the lighting of the light source 1 illustrated in FIG. 6. As one reason, it is considered that since the light sources 1A, 1B, and 1C illustrated in FIG. 12 are lit, while switching in this order, the lighting time per unit time of each of the light sources 1A, 1B, and 1C is shortened as compared with the lighting time per unit time of the light source 1 illustrated in FIG. 6. Therefore, in the control method of the image reading device according to the modification example of the first example embodiment, amount of heat generated by the light source is small compared to the control method of the image reading device according to the first example embodiment (see FIG. 6). As a result, a heat dissipation structure of the image reading device may be further simplified, and miniaturization and weight reduction may be achieved.

(Other Examples of Imaging Targets and Read Images)

Figure 13A:
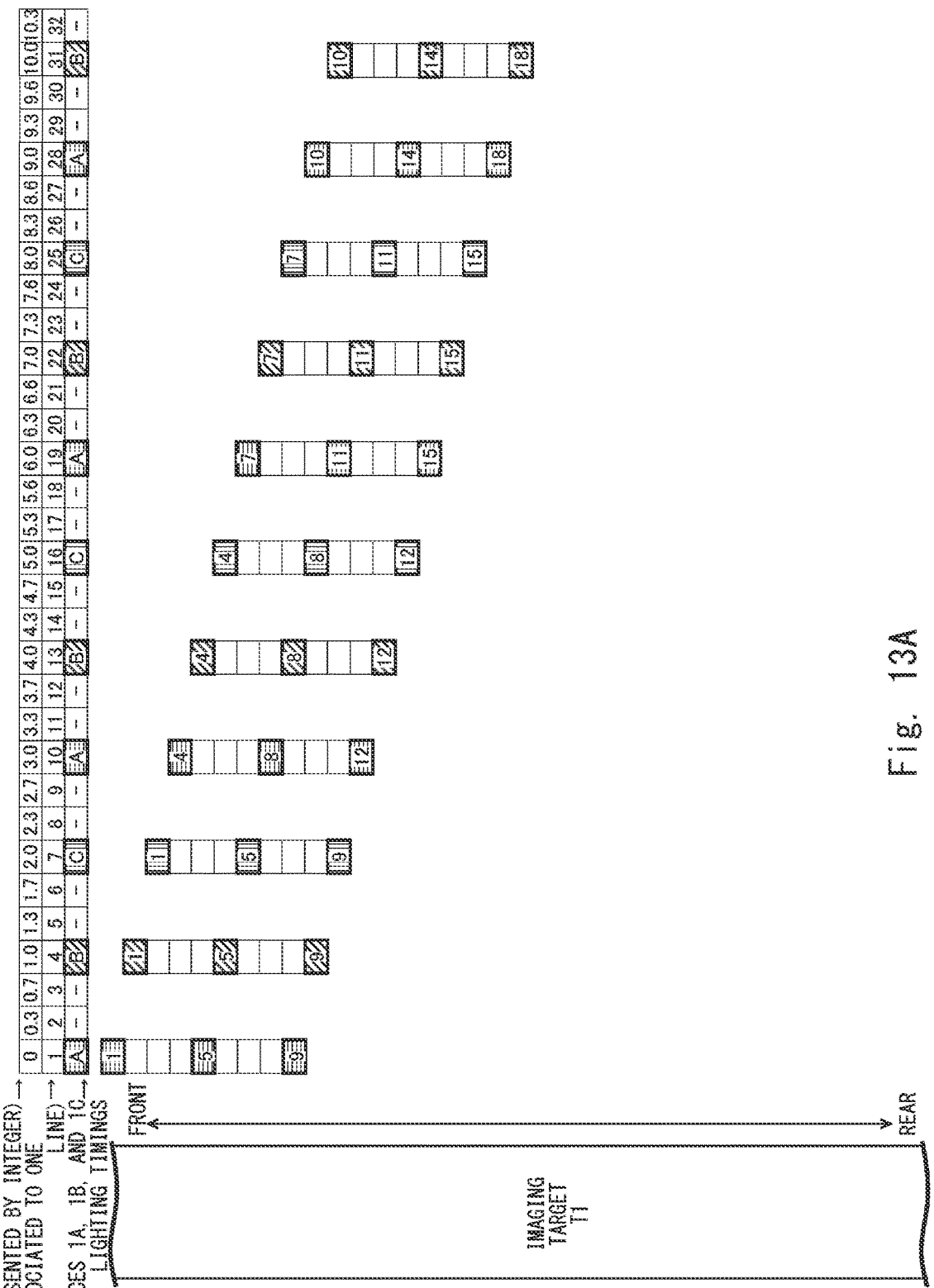
FIG. 13A is a schematic diagram illustrating a relationship among a portion of an imaging target article, an imaging timing, an illumination timing, and an output image.
Figure 13B:
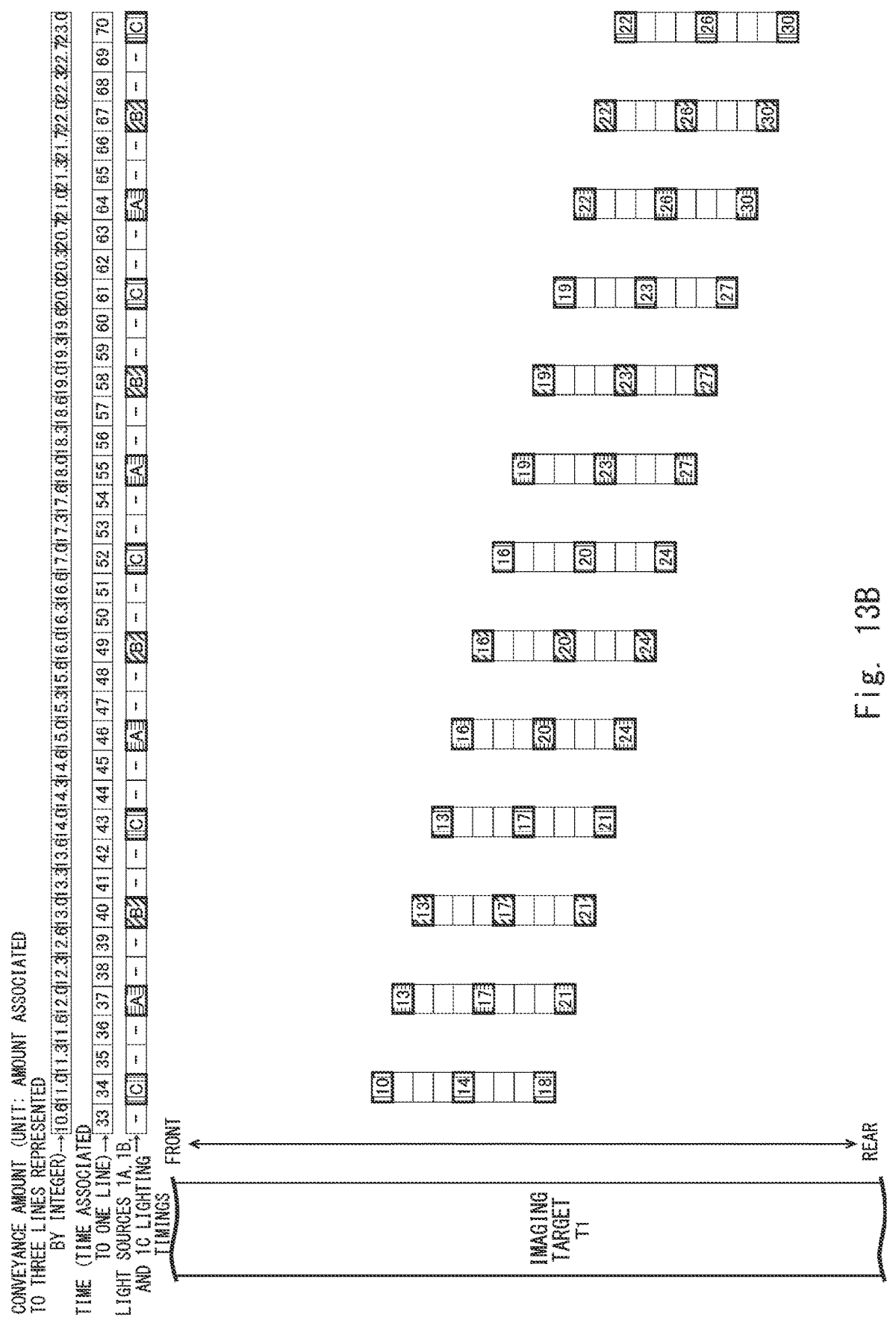
Figure 13C:
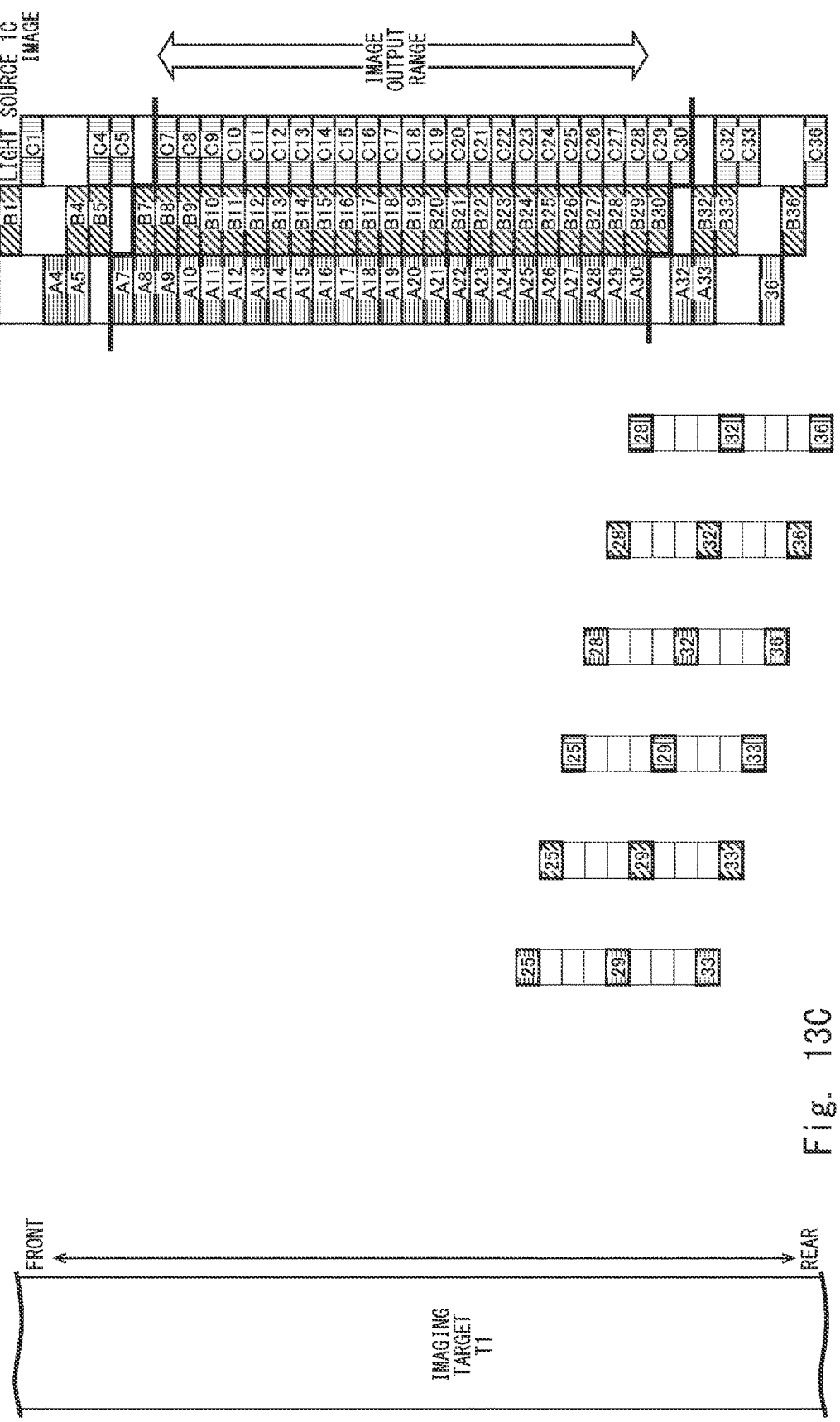
FIG. 13C is a schematic diagram illustrating a relationship among a portion of an imaging target article, an imaging timing, an illumination timing, and an output image.

One example generates a read image indicating the imaging target T1 using the image reading device 100a described above. The description thereof will be made with reference to FIGS. 13A, 13B, and 13C. FIGS. 13A, 13B, and 13C are schematic diagrams illustrating a relationship among a portion of an imaging target article, imaging timing, illumination timing, and an output image.

Note that, in FIGS. 13A to 13C, while line-shaped images A1, A4, A5, A7 to A30, A32, A33, A36, B1, B4, B5, B7 to B30, B32, B33, B36, C1, C4, C5, C7 to C30, C32, C33, and C36 are illustrated, [A], [B], and [C] are omitted as appropriate for the sake of clarity, and only the numbers 1, 4, 5, 7 to 30, 32, 33, and 36 are described and hatched according to [A], [B], and [C].

FIG. 13A illustrates a timing at which the light sources 1A, 1B, and 1C are lit and a portion where the imaging target T1 is imaged at each of the conveyance times 0 to 10.3. Similarly, FIG. 13B illustrates a timing at which the light sources 1A, 1B, and 1C are lit and a portion at which the imaging target T1 is imaged at each of the conveyance times 10.6 to 23.0. Similarly, FIG. 13C illustrates a timing at which the light sources 1A, 1B, and 1C are lit and a portion at which the imaging target T1 is imaged at each of the conveyance times 23.3 to 29.6. The conveyance times 0 to 29.6 are associated with the conveyance amounts 1 to 90. The conveyance amount 1 is a width of three lines. The imaging target T1 is conveyed at a constant speed. The constant speed is the conveyance amount 1 per unit conveyance time 1. The conveyance amount 1 is the same as the three line widths.

Each time the conveyance amount of the imaging target T1 increases by one, the light sources 1A, 1B, and 1C are switched in this order to irradiate illumination light, and three images of the imaging target T1 are captured. For example, when the conveyance amount is 0, the imaging target T1 is imaged in a state in which the illumination light from the light source 1A is irradiated, and the line-shaped images A1, A5, and A9 by the light source 1A are generated. When the conveyance amount is 1, the imaging target T1 is imaged in a state in which the illumination light from the light source 1B is irradiated, and the line-shaped images B1, B5, and B9 by the light source 1B are generated. When the conveyance amount is 2, the imaging target T1 is imaged in a state in which the illumination light by the light source 1C is irradiated, and the line-shaped images C1, C5, and C9 by the light source 1C are generated. These steps are repeated until the conveyance amount of the imaging target T1 reaches 90. As a result, as illustrated in FIGS. 13A to 13C, line-shaped images A1, A4, A5, A7 to A30, A32, A33, A36, B1, B4, B5, B7 to B30, B32, B33, B36, C1, C4, C5, C7 to C30, C32, C33, and C36 are generated.

Subsequently, as illustrated in FIG. 13C, the line-shaped images A1, A4, A5, A7 to A30, A32, A33, and A36 are arranged in ascending order. Similarly, the line-shaped images B1, B4, B5, B7 to B30, B32, B33, and B36 are arranged in ascending order. Similarly, the line-shaped images C1, C4, C5, C7 to C30, C32, C33, and C36 are arranged in ascending order. Among the arranged line-shaped images, a line-shaped image on which a portion associated to the imaging target T1 overlaps may be used as a read image. For example, the line-shaped images A9 to A30, the line-shaped images B8 to B29, and the line-shaped images C7 to C28 each overlap a portion associated to the imaging target T1. The line-shaped images A9 to A30, the line-shaped images B8 to B29, and the line-shaped images C7 to C28 may be used as read images.

When the read image by the light source 1A is composed of the line-shaped images A9 to A30, the line-shaped images A9 to A30 are successive without missing. Therefore, the read image indicates a main portion of the imaging target T1.

Further, when the read image by the light source 1B is composed of the line-shaped images B8 to B29, the line-shaped images B8 to B29 are successive without missing. Therefore, the read image indicates a main portion of the imaging target T1.

Further, when the read image by the light source 1C is composed of the line-shaped images C7 to C28, the line-shaped images C7 to C28 are successive without missing. Therefore, the read image indicates a main portion of the imaging target T1.

In the read images by the light sources 1A, 1B, and 1C, the line-shaped images are arranged in ascending order and do not overlap. The end portions of adjacent line-shaped images in the conveying direction are abutted against each other. Therefore, there is no gap between adjacent line-shaped images, and the line-shaped images do not overlap. As a result, it is possible to avoid a reduction in the reading resolution of the read images by the light sources 1A, 1B, and 1C.

In addition, it is possible to acquire a read image by the light sources 1A, 1B, and 1C that irradiate different types of illumination light.

Other Example Embodiments, Etc.

Figure 14:
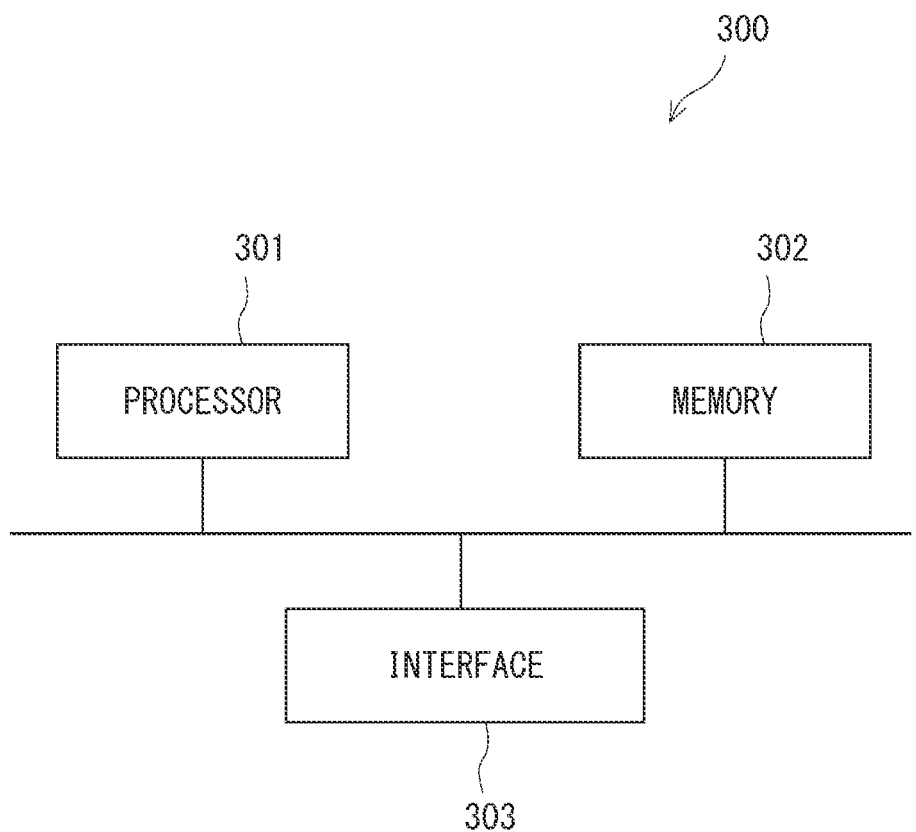
FIG. 14 is a diagram illustrating one example of a hardware configuration included in an image reading device.

The image reading devices 100 and 100a according to the example embodiments described above may have the following hardware configuration. FIG. 14 is a diagram illustrating one example of a hardware configuration included in the image reading devices 100 and 100a. In the various example embodiments described above, the present invention may take the form of a processing method as described above with respect to the processing procedures in the image reading devices 100 and 100a.

An image reading device 300 illustrated in FIG. 14 includes a processor 301 and a memory 302 together with an interface 303. The control unit 4 described in the above-described example embodiments is implemented by the processor 301 reading and executing a control program stored on the memory 302. That is, the program is a program for causing the processor 301 to function as the control unit 4 or a part thereof. The program can be said to be a program for causing the image reading device 100 of FIG. 2 to execute processing in the control unit 4 or a part thereof.

The program described above may be stored using various types of non-transitory computer-readable media and provided to a computer (a computer including an information notification device). Non-transitory computer-readable media include various types of tangible storage media. Examples of non-transitory computer-readable media include magnetic recording media (e.g., flexible disks, magnetic tapes, and hard disk drives), magneto-optical recording media (e.g., magneto-optical disks). Further, examples of non-transitory computer-readable media include CD read-only memory (ROM), CD-R, and CD-R/W. In addition, examples of non-transitory computer-readable media include semiconductor memories (e.g., mask ROM, programmable ROM (PROM), erasable PROM (EPROM), flash ROM, and random-access memory (RAM)). The program may also be provided to the computer by various types of transitory computer-readable media. Examples of transitory computer-readable media include electrical signals, optical signals, and electromagnetic waves. The transitory computer-readable media may provide the program to the computer via wired communication paths, such as electrical wires and optical fibers, or via wireless communication paths.

Further, in the various example embodiments described above, the present disclosure may also take a form as a control method of the image reading device, as described in the procedure of processing in the image reading device. The program described above can be said to be a program for causing the image reading device to execute such a control method.

The present invention is not limited to the above-described example embodiments, and modification may be made as appropriate without deviating from the scope of the invention. In addition, the present disclosure may be implemented by appropriately combining example embodiments and examples thereof. For example, in each of the above-described example embodiments, a read image indicating the workpiece W1, which is a substantially plate-shaped body, is generated, but a read image indicating a workpiece having various other shapes may be generated. The shape of the workpiece may be, for example, a substantially spherical shape, a substantially lump shape, a substantially rod shape, or a substantially linear shape, or further these shapes may be mixed. Further, in each of the above-described example embodiments, since the N line-shaped regions of the workpiece is able to be imaged at once, the present invention is also suitable for a workpiece to be conveyed at high speed. Such a workpiece W1 suitable to be conveyed is, for example, a container or a fruit conveyed by a belt conveyor.

While the present invention has been particularly shown and described with reference to the example embodiments thereof, the present invention is not limited to the above. It will be understood by those of ordinary skill in the art that various changes in form and details may be made therein without departing from the spirit and scope of the present invention as defined by the claims.

This application is based upon and claims the benefit of priority from Japanese Patent Application No. 2020-035793, filed on Mar. 3, 2020, the disclosure of which is incorporated herein in its entirety by reference.

REFERENCE SIGNS LIST 100, 100a, 200 IMAGE READING DEVICE
1, 1A, 1B, 1C LIGHT SOURCE
2 LENS
3, 23 IMAGING UNIT
4 CONTROL UNIT
11 EXTERNAL SYNCHRONIZATION SIGNAL ACQUISITION UNIT
12 IMAGING SYSTEM/ILLUMINATION SYSTEM CONTROL UNIT
13 SCANNER CONTROL UNIT
13a EXTERNAL SYNCHRONIZATION SIGNAL COUNTING UNIT
13b MEMORY CONTROL UNIT
13c IMAGE PROCESSING CONTROL UNIT
15 IMAGE PROCESSING UNIT
16 IMAGE MEMORY
17 IMAGE INTERFACE
31, 32, 33 LIGHT-RECEIVING ELEMENT ROW
31p, 32p, 33p LIGHT-RECEIVING ELEMENT
301 PROCESSOR
302 MEMORY
303 INTERFACE
L21, L22, L23 LIGHT
ST1, ST2, ST3, ST4, ST5, ST6, ST7, ST8 STEP
ST101 IMAGING STEP
ST102 POST-CONVEYANCE IMAGING STEP
ST103 READ IMAGE GENERATION STEP
T1 IMAGING TARGET
1 to 36 LINE-SHAPED REGION
W1 WORKPIECE
W11, W12, W13 LINE
W11a WIDTH
W11p, W12p, W13p POINT
WW1, WW2 DISTANCE
X1 WORKPIECE CONVEYING DIRECTION
A1, A4, A5, A7 to A30, A32, A33, A36, B1, B4, B5, B7 to B30, B32, B33, B36, C1, C4, C5, C7 to C30, C32, C33, C36, M1, M4, M5, M7 to M30, M32, M33, M38 LINE-SHAPED IMAGE

What is claimed is:

1. A control method of an image reading device, comprising:
a first step of generating N (N is a natural number of 2 or more) line-shaped images indicating N line-shaped regions in an imaging target being conveyed in a conveying direction by imaging the N line-shaped regions extending in a direction perpendicular to the conveying direction, the N line-shaped regions being arranged in parallel, spaced apart by a width of N line-shaped regions in the conveying direction;
a second step of performing, after the first step has been performed, the same step as the first step at a point in time when the imaging target is conveyed by an amount associated to a width of the N 1 line-shaped regions; and
a step of generating a read image by arranging N line-shaped images generated in each of the steps in ascending order.

2. The control method of the image reading device according to claim 1, wherein the step of generating the read image is performed after repeating the second step a plurality of times in succession.

3. The control method of the image reading device according to claim 2, wherein the step of generating the read image includes generating the read image by outputting only a plurality of line-shaped images arranged in succession among the line-shaped images arranged in ascending order.

4. The control method of the image reading device according to claim 1, wherein the first and second steps include starting irradiation of illumination light to the imaging target being conveyed in synchronization with an imaging timing of imaging the imaging target being conveyed.

5. The control method of the image reading device according to claim 4, wherein the first and second steps include performing irradiation of the illumination light by using a plurality of illumination light sources having different light source colors.

6. The control method of the image reading device according to claim 5, wherein the first and second steps include performing irradiation of the illumination light by using a different illumination light source having a different light source color for each of the imaging timings.

7. The control method of the image reading device according to claim 1, wherein the first and second steps include, after starting irradiation of illumination light to the imaging target being conveyed in synchronization with an imaging timing of imaging the imaging target being conveyed, stopping irradiation of the illumination light at a point in time when the imaging target is conveyed by a distance of one line-shaped region in the imaging target in the conveying direction.

8. An image reading device comprising:
an imaging unit configured to include N line-shaped imaging elements arranged in parallel at predetermined intervals;
an external synchronization signal acquisition unit configured to acquire an external synchronization signal indicating that an imaging target has been conveyed by an amount associated to a width of N−1 line-shaped regions in a conveying direction; and
an image processing control unit, wherein,
each time the external synchronization signal acquisition unit acquires the external synchronization signal, the imaging unit uses the N line-shaped imaging elements and images N line-shaped regions in the imaging target, the N line-shaped regions being arranged in parallel, spaced apart by a width of N line-shaped regions in the conveying direction and extending in a direction perpendicular to the conveying direction, thereby generating a plurality of sets of N line-shaped images, and
the image processing control unit generates a read image indicating the imaging target by arranging N sets of the generated N line-shaped images in ascending order.

9. A non-transitory computer-readable medium storing a program causing a computer to execute:
a first step of generating N line-shaped images indicating N line-shaped regions in an imaging target being conveyed in a conveying direction by imaging the N line-shaped regions extending in a direction perpendicular to the conveying direction, the N line-shaped regions being arranged in parallel, spaced apart by a width of N line-shaped regions in the conveying direction;
a second step of performing, after the first step has been performed, the same step as the first step at a point in time when the imaging target is conveyed by an amount associated to a width of N−1 line-shaped regions; and
a step of generating a read image by arranging N line-shaped images generated in each of the steps in ascending order.

* * * * *